Oct. 6, 1970

B. BATES ET AL 3,531,894

HYDRAULIC TURNSTILE

Filed March 5, 1968

INVENTORS:
BRADFORD BATES
EDWARD DILLINGHAM
AMABLE A. De BENITO
WILLIAM M. SOUTHALL

AGENT

Oct. 6, 1970      B. BATES ET AL      3,531,894

HYDRAULIC TURNSTILE

Filed March 5, 1968      3 Sheets-Sheet 3

INVENTORS:
BRADFORD BATES
EDWARD DILLINGHAM
AMABLE A. Pe BENITO
WILLIAM M. SOUTHALL

AGENT

United States Patent Office
3,531,894
Patented Oct. 6, 1970

3,531,894
HYDRAULIC TURNSTILE
Bradford Bates, Santa Monica, Edward Dillingham, Pacific Palisades, Amable A. Pe Benito, Glendale, and William M. Southall, Pacific Palisades, Calif., assignors to Advance Data Systems Corporation, Beverly Hills, Calif., a corporation of New York
Filed Mar. 5, 1968, Ser. No. 710,588
Int. Cl. E06b 11/08
U.S. Cl. 49—46                          10 Claims

ABSTRACT OF THE DISCLOSURE

An electrohydraulic turnstile wherein an hydraulic lock mechanism employs a piston in a fluid filled cylinder engaged with the turnstile hub. The cylinder is filled with an incompressible hydraulic fluid. The turnstile is unlocked by opening a shuttle valve and allowing the hydraulic fluid to be pushed from the cylinder into a reservoir. A commutator and relays cooperate with a solenoid which is normally actuated, keeping the shuttle valve closed and locking the turnstile in barrier position. Operation of a switch, as by a coin, token, or a ticket operated mechanism, releases the solenoid and allows rotation of the turnstile in the proper direction. The commutator rotating with the turnstile controls cyclic energization of the solenoid and opening and closing of the shuttle valve.

---

The present invention relates to turnstiles, and more particularly to an electrically controlled, hydraulically operated turnstile.

Turnstiles heretofore known to the art have generally been mechanical devices containing many highly stressed parts. As a result, they are subject to a great deal of wear and tear and a substantial amount of maintenance is required. In addition, the mechanical parts require precise machining and manufacturing techniques. As a result, mechanical turnstiles have been relatively expensive to buy and maintain. More recently, electrically controlled turnstiles have appeared. While the number of mechanical parts have been substantially reduced, there is still a great deal of precision machine work required, and a great deal of mechanical maintenance is essential for continued reliable operation.

In contrast to the turnstiles of the prior art, the present invention employs few and lightly stressed mechanical parts. The basic operating mechanism is hydraulic, while the controls consist of a simple electrical circuit employing a solenoid and relays. One of the major advantages of the turnstile of the present invention is a fail-safe feature, wherein a power loss to the turnstile automatically releases the barrier arms for free operation.

It is, therefore, an object of the present invention to provide a hydraulically operated turnstile.

Another object of the present invention is to provide an electrically controlled, hydraulically operated turnstile.

Another object of the present invention is to provide a turnstile which may be electrically set to function in either a clockwise or counter-clockwise direction.

Another object of the present invention is to provide a fail-safe turnstile which is free to rotate in either direction in the event of power failure.

Another object of the present invention is to provide a turnstile wherein a passenger easily rotates the barrier through the first half of the cycle and the barrier continues to rotate unaided through the last half of the cycle.

Another object of the present invention is to provide a turnstile damped to avoid harsh operation and to avoid harm to a passenger who may strike a barrier area.

Another object of this invention is to provide a turnstile which is simple and inexpensive to manufacture, compact, and is reliable in operation.

These and other objects and advantages of the present invention will become apparent from the following specification and accompanying drawings, wherein.

Figure 1:
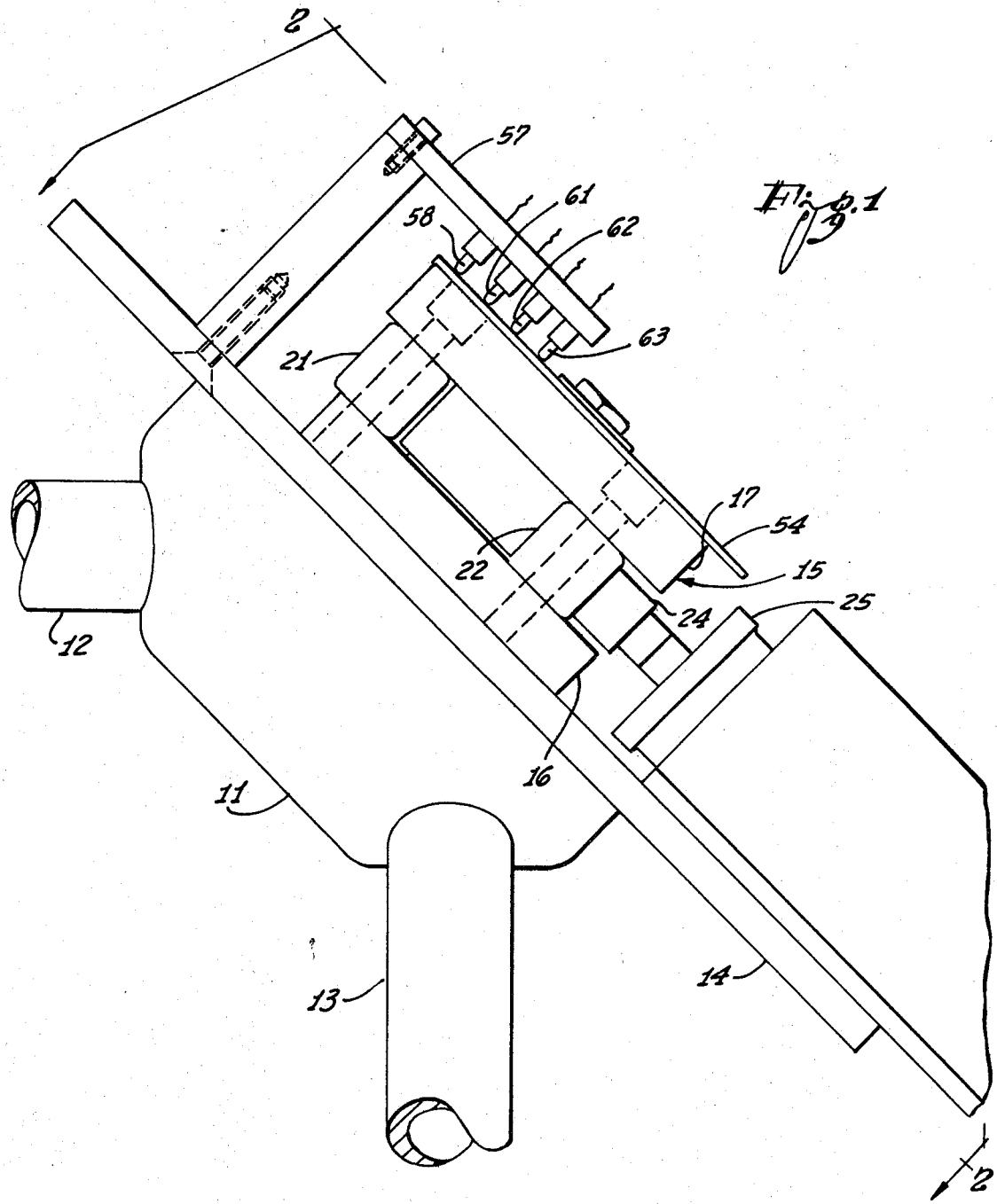
FIG. 1 is an elevation of the electron-hydraulic turnstile mechanism.

Referring now to the drawings, hub 11, carrying three barrier arms of which only arm 12 in barrier position and arm 13 are visible in the drawing, is journaled to rotate in base plate 14. A locking surface assembly 15 is affixed to hub 11 and journaled to rotate therewith. Two mounting plates 16 and 17 affixed to hub 11 have fixed therebetween three locking rollers 21, 22 and 23. Rollers 21, 22 and 23 are equally spaced on the circumference of a circle, and are mounted adjacent barrier arms 12, 13 and 14, respectively. It is apparent, therefore, that when barrier arm 12 is in barrier position, as illustrated in FIG. 1, roller 21 is at the top and rollers 22 and 23 are below, as illustrated in FIG. 2.

One of the barrier arms is locked in barrier position by a T-bar 24 cooperating with the two lower rollers. T-bar 24 is secured to hydraulic piston 25. Hydraulic piston 25 rides in hydraulic cylinder 26, and is urged against the locking rollers by a compression spring 27. At the bottom of cylinder 26, a fluid passage 31 connects to valve assembly 32. A fluid reservoir 33 is connected to valve assembly 32 by means of fluid passage 34. Valve assembly 32 combines the functions of a shut-off valve and a check valve connected in parallel. Valve assembly 32 includes a valve piston 35 slideably mounted in a valve cylinder 36. Valve piston 35 has a head 37 cooperating with a valve seat 41 situated between cylinder fluid passage 31 and reservoir fluid passage 34. A compression spring 42 normally urges valve head 37 into sealing position against seat 41. A cylindrical rod 43 with a step-down portion enabling fluid flow in the area of a reservoir fluid passage 34, is secured to valve head 35. A second cylindrical rod 44 is normally adjacent to, but not touching cylindrical rod 43.

A solenoid actuator 45 having a normally energized winding 46 actuates plunger 47. A lever 51, journaled to the frame at bearing 52, normally keeps cylindrical rods 43 and 44 from contact with one another. A tension spring 53 stretched by the actuation of solenoid 45 is provided to retract the plunger from the coil 46 when the solenoid 45 is not actuated.

Figure 2:
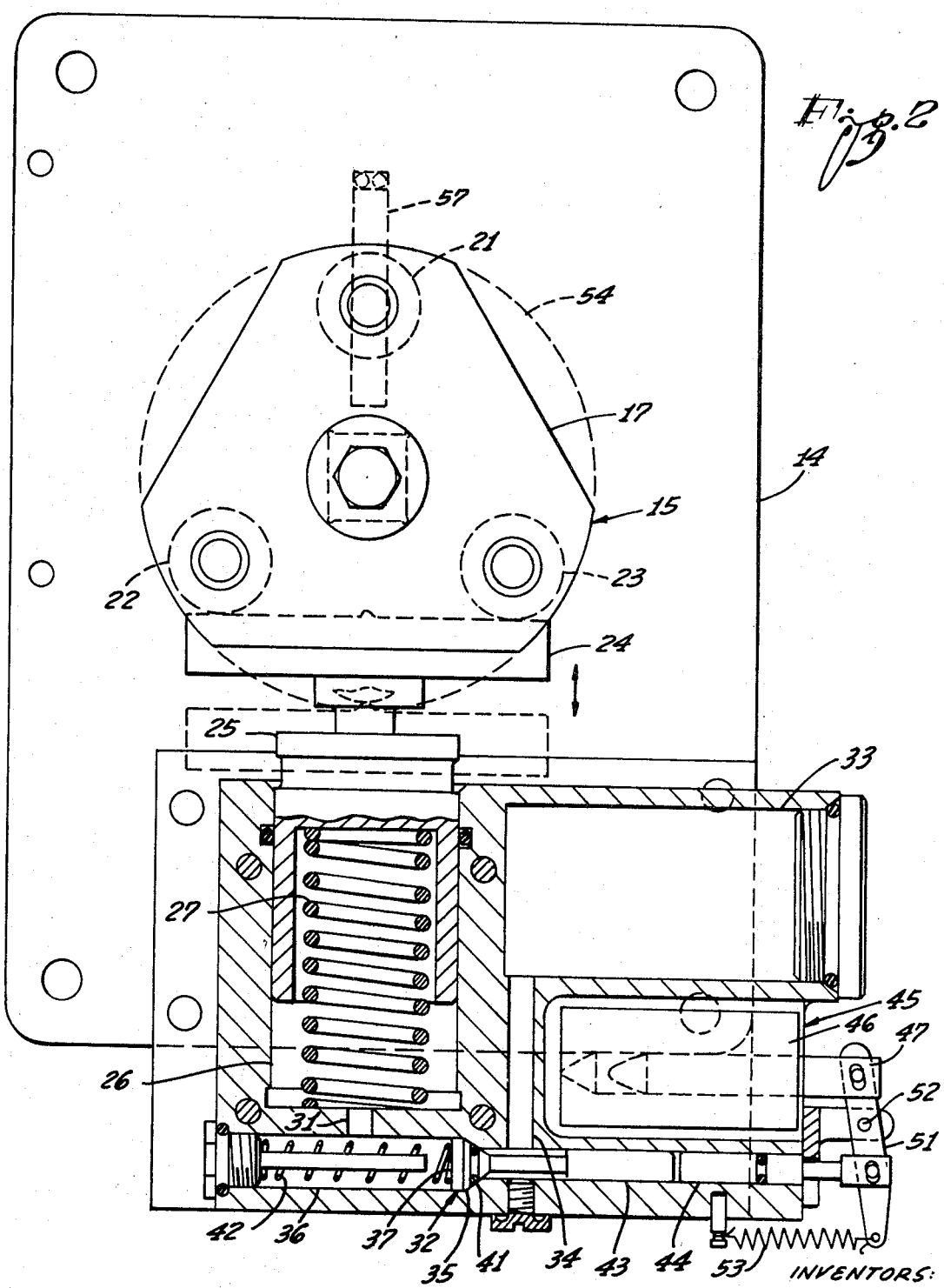
FIG. 2 is a section taken along line 2—2 of FIG. 1.

FIG. 2 illustrates the assembly in the locked position. As is apparent, T-bar 24 is in contact with rollers 22 and 23. Any rotation of the hub assembly requires depression of piston 25. However, the fluid filling cylinder 26 is trapper therein by closed valve 32 locking the piston. When solenoid 45 is de-energized, spring 53 retracts plunger 47 from coil 46. Cylindrical rod 44 contacts cylindrical rod 43, opening valve 32 and compressing spring 42. Piston 25 may then be depressed by one of rollers 22 or 23 acting against T-bar 24, depending upon the direction of rotation, determined in the manner disclosed hereinbelow. T-bar 24 and piston 25 are moved downward to the position illustrated by the dashed lines in FIG. 2. Fluid from cylinder 26 passes through opened valve assembly 32 into reservoir 33. Re-energization of solenoid 45 retracts cylindrical rod 44 from contact with cylindrical rod 43, and compression spring 42 closes valve 32. However, compression spring 27 urges piston 25 and T- bar 24 upwardly, bearing against locking roller 22 or 23, depending upon direction of rotation. The pressure on the fluid in cylinder 26 is thereby reduced, pulling valve assembly 32 open against the force of compression spring 42.

Figure 3:
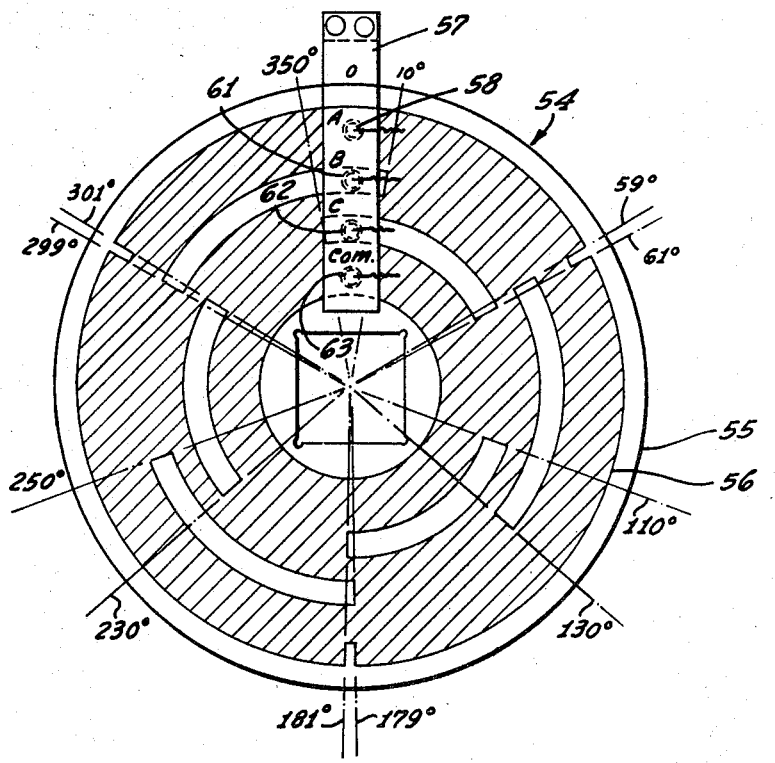
FIG. 3 illustrates a commutator employed in connection with the control circuit.
Figure 4:
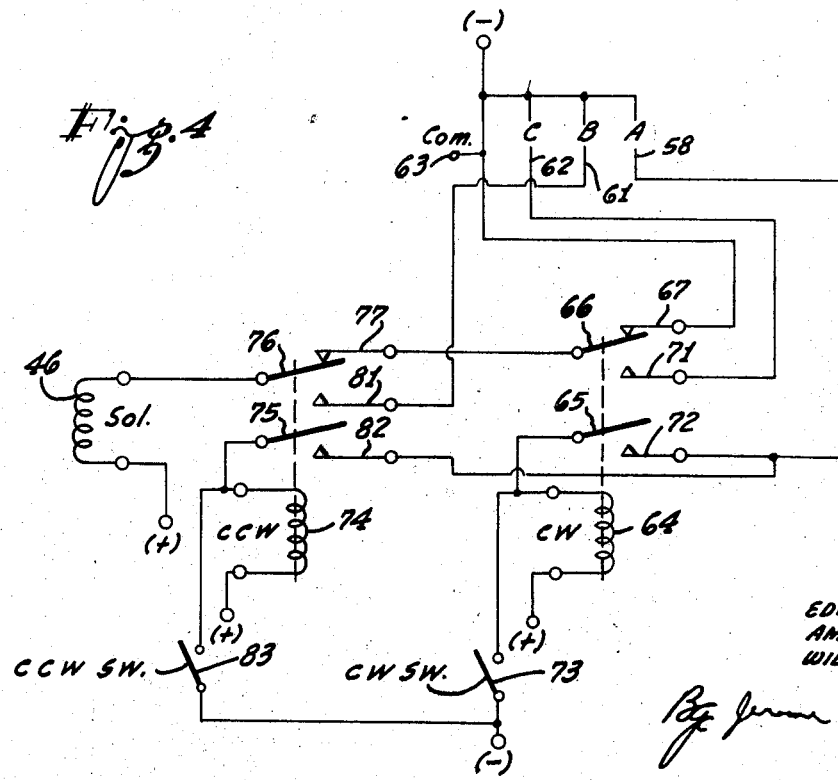
FIG. 4 is a schematic diagram of the electrical control circuit.

Actuation and release of solenoid actuator 45 is controlled by commutator 54, affixed to and rotating with hub 11, and the circuit illustrated in FIG. 4. Commutator 54 comprises disc 55 of insulating material, having a conducting metallic surface 56 bonded thereon. Metallic conducting surface 56 is etched to provide non-conducting arcs as illustrated in FIG. 3. The non-conducting arcs are arranged in three concentric circular tracks. In the outermost track conducting surface 56 is etched away in the area between 59 degrees and 61 degrees, between 179 degrees and 181 degrees, and between 299 degrees and 301 degrees. The intermediate circular track has the conducting surface 56 etched between 59 degrees and 130 degrees, between 179 degrees and 250 degrees and 301 degrees and between 350 degrees and 61 degrees. In addition to the above three tracks a common track, conducting throughout 360 degrees of rotation is arranged adjacent the mounting surface securing commutator 54 to the hub journal.

A brush is provided, cooperating with each track. Thus, brush 57 rides on the outermost track, brush 61 on the central track, brush 62 on the innermost track, and brush 63 on the common track adjacent the center.

A clockwise relay having a coil 64, movable contacts 65 and 66, fixed contacts 67, 71 and 72, and a momentary contact switch 73 controls operation of the turnstile, enabling rotation in the clockwise direction. Similarly, a counter-clockwise relay having a winding 74, movable contacts 75 and 76 and fixed contacts 77, 81 and 82, and a momentary contact switch controls operation of the turnstile mechanism when rotation is desired in the counter-clockwise direction.

As illustrated in FIG. 4 solenoid winding 46 is normally energized, having one end of the winding connected to a positive polarity source of power, not shown, while the other end is connected to a negative polarity power terminal through the normally closed circuit including movable contact 76, fixed contact 77, movable contact 66 and fixed contact 67.

As discussed hereinabove, energization of solenoid coil 46 results in closure of valve assembly 32, locking the turnstile against rotation. Momentary actuation of clockwise switch 73, as by a coin operated mechanism, automatic ticket reading device, or otherwise, closes the circuit including relay coil 64. Movable contact 65 closes a holding circuit, keeping relay coil 64 energized through movable contact 65, fixed contact 72 and brush 58 bearing against the conducting surface of commutator 54. Simultaneously, movable contact 66 and fixed contact 67 open the circuit to solenoid coil 46, and transfer solenoid coil 46 to fixed contact 71, connected to brush 62. As illustrated in FIG. 3, brush 62 is in a non-conducting portion of its associated track. Deenergization of solenoid coil 46 opens valve assembly 32, allowing free fluid passage from cylinder 26 to reservoir 33, freeing the barrier for rotation. Clockwise rotation of the barrier arms rotates commutator 54 as illustrated in FIG. 3, in a counter-clockwise direction. Thus, brush 62 picks up contact with the conducting surface after 61 degrees of rotation. Simultaneously, brush 57 enters a non-conducting arc of two degrees beginning at 59 degrees of rotation. As is apparent from the circuit of FIG. 4, the holding circuit for relay coil 64 is broken when brush 57 reaches the 59 degree point in rotation. The relay releases and simultaneously, energy is applied again to solenoid coil 46 through common brush 63 and brush 62, both fixed contacts 67 and 71, movable contact 66, fixed contact 77 and movable contact 76. Preferably, contacts 67, 71 and movable contact 66 are of the make-before-break variety. Re-energization of solenoid coil 46 occurs at approximately the half way point of the rotation cycle of the barrier arm, while piston 25 is in its lowest position in cylinder 26. Compression spring 27 applies force upwardly in FIG. 2, tending to insure completion of the rotation cycle. The pressure differential between cylinder 26 and reservoir 33 forces valve assembly 32 to open against the force exerted by compression spring 42, allowing fluid to flow into cylinder 26 as spring 27 pushes piston 25 and T-bar 24 upward until T-bar 24 is again in contact with two locking rollers and a barrier arm is in horizontal barrier position. If at any time during this portion of the cycle the passenger transiting the turnstile attempts to move the barrier arm backward, valve assembly 32 will immediately close, effectively locking the piston 25 against downward travel.

If counter-clockwise rotation of the turnstile is desired, fare payment may be employed by equipment not shown and not forming part of the present invention to actuate momentary contact switch 83, closing of switch 83 energizes relay coil 74, thereby closing the relay holding circuit consisting of movable contact 75, fixed contact 82, brush 57 and commutator 54. Movable contact 76 is transferred from fixed contact 77 to fixed contact 81, connected to brush 61 in a non-conducting portion of its track. As a result solenoid 46 is de-energized, enabling rotation of the turnstile. Between 301 degrees and 299 degrees in FIG. 3, the circuit to brush 57 is opened, thereby opening the holding circuit to relay coil 74 and allowing the relay to de-energize. Movable contact 76 transfers to fixed contact 77 re-energizing solenoid coil 46. In a manner similar to that disclosed hereinabove in connection with clockwise rotation, the valve arrangement allows completion of the 120 degree rotation cycle required for one person to pass through the turnstile.

A study of FIGS. 3 and 4 will indicate that attempted counter-clockwise rotation of the turnstile after clockwise rotation has been authorized by actuation of clockwise momentary contact switch 73 results in re-energization of solenoid coil 46, since brush 62 contacts the conductive coating 56 of a commutator 54 at the 350 degree point on its associated track. This completes a circuit to the solenoid coil 46 through fixed relay contact 71, movable relay contact 66, fixed contact 77 and movable contact 76, energizing the solenoid and closing valve 32. However, if pressure is then applied to the barrier arm to move the barrier in the proper direction, the solenoid coil 46 will again be de-energized and normal operation resumed.

While a presently preferred embodiment is disclosed hereinabove, it will be apparent that many modifications and variations of the present invention will occur to one skilled in the art, it is to be understood that the scope of this invention is to be limited only by the terms of the appended claims.

What is claimed is:

1. An electrically controlled, hydraulically operated turnstile comprising:
    a base;
    a rotary hub journaled on said base;
    barrier arms secured to said hub;
    hydraulic means for controlling the rotation of said rotary hub;
    locking elements coupled between said rotary hub and said hydraulic means;
    electrical control means for controlling said hydraulic means to allow said hub to be rotated through a selected arc in at least one direction of rotation in response to an electrical control signal applied thereto; and
    said hydraulic means including valve means controlled by said electrical control means.

2. The device of claim 1 wherein said electrical control means includes means for controlling said hydraulic means to allow said hub to be rotated through a selected arc in either of two electrically selectable directions.

3. The device of claim 2 wherein said hydraulic means includes means for allowing said hub to move freely in both directions upon the removal of electrical power from said turnstile.

4. The device of claim 1 wherein said hydraulic means includes means for applying forces to aid in the rotation of said hub throughout approximately the second half of said selected arc.

5. The device of claim 1 wherein said hydraulic means includes means for dampening the rotational movement of said hub.

6. The device of claim 1 wherein:
said hydraulic means includes an actuator cylinder and piston, a fluid reservoir connected to said actuator cylinder by said valve means, and means connected to said piston cooperating wth said locking elements; and
said electrical control means including electrical circuit switching means completing and opening circuits in accordance with rotation of said rotary hub and electromagnetic means in circuit with said switching means adapted to close said valve means upon energization.

7. In the turnstile mechanism of claim 6, said valve means including:
shut-off valve means between said fluid reservoir and said actuator cylinder, normally held in closed position by said electrical control means;
check valve means between said fluid reservoir and said actuator cylinder; and
resilient means biasing said check valve means to allow one way fluid flow from said fluid reservoir to said actuator cylinder.

8. In the turnstile mechanism of claim 7, said shut-off valve means and said check valve means comprising:
a valve cylinder having a seat at one end;
a first passage connecting said valve cylinder to said actuator cylinder;
a second passage adjacent said seat connected to said fluid reservoir;
a valve piston having a head cooperating with said seat, and a cylindrical body;
resilient means urging said head against said seat to normally close said second passage;
a valve rod adjacent to said cylindrical body adapted to move said valve piston against said resilient means to positively open said second passage;
means fastened to said electromagnetic means to urge said rod against said cylindrical body; and
said electromagnetic means including a solenoid actuator connected to said valve rod to retract said valve rod from said cylindrical body, whereby said valve is held closed by said resilient means.

9. In the turnstile mechanism of claim 8, said electrical circuit switching means including:
a commutator having a plurality of tracks rotating with said rotary hub;
a plurality of brushes, one of said brushes riding on each of said tracks; and
relay means connected in circuit between said brushes and said solenoid actuator.

10. In the turnstile mechanism of claim 6, said locking elements comprising:
a plurality of rollers, each of said rollers mounted behind a corresponding one of said barrier arms;
a T-bar secured to said piston; and
resilient means urging said piston outward and said T-bar into contact with said rollers, whereby said T-bar locks said hub in barrier position when said valve means is closed, and a roller is enabled to depress said T-bar and piston when said valve means is open.

References Cited
UNITED STATES PATENTS
1,602,486  10/1926  Hedley et al. _____ 49—46 X J. KARL BELL, Primary Examiner U.S. Cl. X.R.
49—35; 105—341.5; 235—93